United States Patent
Rosenthal et al.

(10) Patent No.: US 7,155,363 B1
(45) Date of Patent: Dec. 26, 2006

(54) THERMAL IMAGING FOR SEMICONDUCTOR PROCESS MONITORING

(75) Inventors: Peter A. Rosenthal, West Simsbury, CT (US); Jiazhan Xu, Vernon, CT (US); Sylvie Charpenay, Vernon, CT (US); Joseph E. Cosgrove, Columbia, CT (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 09/199,677

(22) Filed: Nov. 25, 1998

Related U.S. Application Data

(60) Provisional application No. 60/067,202, filed on Dec. 1, 1997.

(51) Int. Cl.
*G01K 11/00* (2006.01)
*G06F 15/00* (2006.01)

(52) U.S. Cl. ............... 702/135; 702/132; 702/134; 702/136

(58) Field of Classification Search ............... 702/99, 702/130, 134–138, 131, 132, 172; 374/126, 374/128, 129; 250/225–226, 252.1; 356/45, 356/367, 369, 381, 382
See application file for complete search history.

(56) References Cited

U.S. PATENT DOCUMENTS

| | | | | |
|---|---|---|---|---|
| 4,881,823 A | * | 11/1989 | Tanaka et al. | 374/126 |
| 4,985,858 A | * | 1/1991 | Morrison, Jr. et al. | 702/135 |
| 5,239,488 A | * | 8/1993 | Markham et al. | 702/135 |
| 5,403,433 A | * | 4/1995 | Morrison et al. | 356/381 |
| 5,450,205 A | * | 9/1995 | Sawin et al. | 356/382 |
| 5,501,637 A | * | 3/1996 | Duncan et al. | 250/225 |

* cited by examiner

*Primary Examiner*—Bryan Bui
(74) *Attorney, Agent, or Firm*—Proskauer Rose LLP

(57) ABSTRACT

The method measures the temperature, emissivity, and other properties of relatively smooth surfaces radiating thermal energy, and is especially adapted for monitoring semiconductor fabrication processes. Temperature is determined by relating measured radiance to the predictions of the Planck radiation law, using knowledge of the emissivity determined from an analysis of the polarization of the thermally emitted radiance. Additional information regarding the properties of thin films, such as thickness and composition, can be computed from the emissivity or the ratio of the emissivities measured at two independent polarizations. Because the data are obtained from the intrinsic thermal radiance, rather than from an extrinsic light source, the measurement can be performed when it is inconvenient or impossible to provide a light source for reflectance measurements.

19 Claims, 4 Drawing Sheets

THERMAL IMAGING FOR SEMICONDUCTOR PROCESS MONITORING

CROSS-REFERENCE TO RELATED PROVISIONAL APPLICATION

This application claims the benefit of provisional Application No. 60/067,202, bearing the foregoing title and filed on Dec. 1, 1997 in the names of the inventors designated herein.

STATEMENT REGARDING GOVERNMENT INTEREST

The United States Government has rights in this invention under Department of Defense Contract No. F 33615-97-C-5134.

BACKGROUND OF THE INVENTION

The production of future generations of submicron VLSI silicon microelectronics and compound semiconductor devices will depend critically on continued advances in process sensing and control. In present-day manufacturing, process yield limitations are brought about by the high sensitivity of layer properties to process conditions, and the inability to control process conditions adequately throughout the process sequence. Present technology relies primarily upon the inference of important process parameters from indirect sensor signals, and upon open-loop control using previous calibration data, together with the (often unfulfilled) hope that process conditions will not drift appreciably, both within a given run and from run-to-run.

As the semiconductor industry moves to increase process throughput, increase wafer diameters, tighten uniformity, and decrease batch sizes (culminating with the modern single wafer rapid thermal processor), the need for real-time, whole-wafer sensing is becoming acute. To ensure both wafer-to-wafer repeatability and also uniformity, wafer sensors must provide extremely accurate multipoint measurements, with absolute accuracies and precision of temperature measurement in the range of ±1° C. The high throughputs that are typical of modern semiconductor processes place additional demands on sensor performance, requiring the capability to track thermal processes with temperature ramp rates up to 50° C. per second.

A variety of sensors have been developed for real-time in-situ measurements of temperature, thickness, and other film properties. By virtue of its speed, sensitivity, and low cost, optical pyrometry has become the most widely adopted in-situ temperature sensor, and has become ubiquitous in commercial single wafer thermal processing system. Pyrometry, though, suffers from two significant practical limitations. Firstly, pyrometric sensors, traditionally employed as single point sensors, become less suitable when intra-wafer uniformity is critical. Secondly, pyrometers require accurate knowledge of the wafer emissivity; they become unreliable or inaccurate when the emissivity is not known, when it varies during processing, or when it varies from wafer to wafer. This situation arises quite often during semiconductor processing because the emissivity depends on the optical properties of the films and substrates, which are themselves temperature dependent. The problem of emissivity variation has been addressed in some applications by incorporating a reflection sensor that provides a real-time measure of the specular emissivity at the desired wavelengths. However, the geometric complications imposed by the reflection optics complicates the emission/reflection technique unsuitable for spatially-resolved whole wafer measurements. The practical barriers to achieving fast and accurate temperature monitoring across large wafers is perhaps the most significant hurdle blocking broader applications of rapid thermal process technology.

A variety of sensors have been developed for real-time in-situ measurements of temperature, thickness, and other film properties. Virtually all practical non-contact wafer temperature sensors are based on pyrometry, the quantitative analysis of temperature from the thermal radiation emitted by the hot surface. In general, the thermal radiance $R(v, T)$ emitted by a hot surface is equal to the product of the wavelength dependent emissivity $\epsilon(v,T)$ and the Planck function $P(v,T)$ associated with the wafer temperature:

$$R(v) = \epsilon(v, T)P(v, T) = \epsilon(v, T)\frac{hcv^\circ}{e^{\frac{hcv}{k_B T}} - 1} \qquad \text{Equation 1}$$

In traditional pyrometry, the temperature is inferred from the radiance using an assumed value for the emissivity. In many situations however this assumption is not valid, and can lead to uncontrolled errors in temperature measurements and associated drifts in processing temperature. Pyrometry, as it is applied in semiconductor processing, has traditionally been limited to single point measurements, with multipoint capability requiring multiple pyrometers. A logical extension of multiple pyrometers is the concept of a focal plane array radiometer.

Significant improvements to pyrometry have been demonstrated by integrating the capability to measure the emissivity in addition to the thermal radiance (see Morrison et al U.S. Pat. No. 4,985,858). The emissivity $\epsilon$ at a particular wavelength and polarization can be related to the measured reflectance and transmittance by invoking conservation of energy: $1=\epsilon+\rho+T$, where $\rho$ and $T$ are the reflectance and transmittance at the selected wavelength and polarization. If a wafer is sufficiently absorbing and thick that it is opaque at the selected wavelength, then the emissivity is given simply by $\epsilon=1-\rho$, and the emissivity can then be computed from a measurement of the reflectance (see P. W. Morrison, Jr., P. R. Solomon, M. A. Serio, R. M. Carangelo, J. R. Markham, *Sensors Magazine*, 8; J. R. Markham, K. Kinsella, C. R. Brouilette, R. M. Carangelo, M. D. Carangelo, P. E. Best, and P. R. Solomon, *Rev. Sci. Instrum.*, 64, 2515–2522, 1993). Such emissivity tracking temperature measurements have been demonstrated using a variety of single wavelength and spectroscopic hardware, and various systems have been integrated into rapid thermal process equipment (see S. Farquharson, P. Rosenthal, P. Solomon, N. Ravindra, and F. Tong, "Development of a Non-Contact Real-Time Sensor for $SiO_2$ Layer Thickness and Temperature in a Rapid Thermal Oxidation Reactor", *Transient Thermal Processing Techniques in Electronic Materials*, Ed. N. M. Ravindra and R. K. Singh, The Minerals, Metals & Materials Society, 1996), PLD equipment (see P. Solomon, S. Liu, J. Haigis, P. Rosenthal and S. Farquharson, "Process Monitoring and Control During Plasma and other processing of Semiconductors" AirForce SBIR Phase II Final Report, WL-TR-95-5016, 1995), and MBE equipment (see S. Farquharson, K. Kinsella, J. Markham, P. Solomon, M. Carangelo, J. Haigis, N. Ravindra, F. Tong, M. Bevan, and G. Westphal, "Real-Time Process Control of Molecular/beam Epitaxial Growth of Mercury Cadmium Telluride Films by Fourier Transform Infrared Spectroscopy," *Transient Thermal Processing Techniques in Electronic Materials*, Ed. N. M. Ravindra and R. K. Singh, The Minerals, Metals & Materials Society, 1996); they are also the subject of U.S. Pat. Nos. 4,956,538, 5,156,461, and 5,564,830. Such combined emission/reflection techniques, and reflection-assisted techniques, can have excellent accuracy and precision, provided the samples are specular and opaque; however, they are poorly suited to whole wafer sensing during processing.

More particularly, although the use of reflection-assisted emissivity tracking enables extremely accurate measurement of temperature, in many applications the samples are not sufficiently specular to get a useful reflectance measurement, and geometric considerations often prohibit performing reflectance measurements on a dense point grid from a wafer in a process chamber. Other difficulties arise, in many process situations, from the necessity to get reliable calibration reflectance reference measurements for accurate emissivity tracking. This requires the introduction of a calibration reference of accurately known reflectance into the process chamber at very nearly the same mechanical positioning as the sample to be measured, often a difficult task and a significant practical technical barrier.

SUMMARY OF THE INVENTION

Accordingly, broad objects of the present invention are to provide a method that affords emissivity tracking without the need for an extrinsic light source for making reflectance measurements, and to provide apparatus that is especially adapted for carrying out such a method. More specific objects are to provide a method and apparatus that are capable of performing combined reflection and emission measurements at a single point on a sample, performed at multiple wavelengths; to provide a method and apparatus that are capable of performing temperature measurements from polarized radiance measurements at multiple points on a sample; to provide a method and apparatus for single point-single wavelength, or narrow band polarized emission and reflectance measurements; and to provide a method and apparatus for a multi-point imaging, using an optomechanical scanner to scan the field of view of the detector to user-specified locations on the sample.

It has now been found that the foregoing and related objects of the invention are attained in a method for measuring the temperature, emissivity, and other properties of relatively smooth surfaces that radiate thermal energy. The temperature is determined by relating the measured radiance to the predictions of the Planck radiation law, using knowledge of the emissivity determined from an analysis of the polarization of the thermally emitted radiance. The calculation of the emissivity employs either a model-based analysis of the optical properties of the radiating surface, or measurements of the polarization-dependent reflectance. The polarized thermal radiance can be determined from as few as two intensity measurements, filtered through two linearly independent polarizing filters. After the thermal emissivity is determined, the temperature is calculated numerically from the Planck law. Additional information regarding thin-film properties, such as thickness and composition, and physical properties such as roughness, crystallinity, interface quality, and strain, can be computed from the emissivity or from the ratio of the emissivities measured at two independent polarizations; this information is analogous to that which may be determined from reflectance data, using the methodology described, for example, in U.S. Pat. No. 5,450,205. Because however the data are obtained from the intrinsic thermal radiance, rather than from an extrinsic light source, the instant invention enables measurements to be made when it is inconvenient or impossible to provide a light source for reflectance (albeit in certain preferred embodiments reflected light measurements are employed for computing emissivity values).

More particularly, certain objects of the invention are attained by the provision of a method for determining the emissivity of a surface from measurements of the reflectance and the thermally emitted radiance, performed at two or more polarizations at one or more wavelengths. Other objects are attained by the provision of a method for determining the polarization-dependent emissivity of a surface from measurements of the ratio of the thermally emitted radiance, performed at two linearly independent polarizations at one or more wavelengths, in which method the measured polarized radiance ratio is preferably compared to the predictions of an optical model based upon the Fresnel relations for reflection and refraction. The method may be applied to film stacks on substrates in which the measured radiance ratio is related to the predictions of a model calculation of the expected polarized radiance ratio, determined from a specified model film stack employing descriptions of the optical dielectric functions of each of substrate and constituent layers within the film stack. The method may also be applied to finely patterned film stacks and substrates in which the measured radiance ratio is related to the predictions of a model calculation of the expected polarized radiance ratio, where the modeled emissivity is computed as a weighted average of the emissivity associated with model film stacks specified independently in separate zones within the sample pattern. The method may additionally be applied to finely patterned structures in which the patterned surface is approximated by a hypothetical uniform surface with optical constants derived from the polarized emissivity measurements. A look-up table (normally stored in computer memory), in which values of emissivity are correlated to values of polarized emissivity ratios (as hereinafter defined), may also be used to compute emissivity values based upon measured emissivity ratios.

Additional objects of the invention are attained by the provision of a method for determining the temperature of a surface, in which method the measured thermal radiance of a sample, normalized by its specular emissivity, is fit to the theoretical radiance of a perfect black body emitter, i.e., a Planck function at one or more wavelengths. The emissivity value employed in determining the surface temperature may be obtained using any of the methods herein described.

Still other objects are attained by the provision of a method in which the thickness of a film on a sample is determined, in accordance with which method the polarization dependence of the emissivity, calculated from radiance measurements at multiple polarizations, is related to the predictions of a model calculation of the expected polarized emissivity ratio from a sample. Such a method may be applied to homogenous samples, where the polarization dependence of the emissivity, calculated from measurements at multiple polarizations, is related to the theoretical predictions obtained from the Fresnel equations for the polarization-dependent reflection coefficients of the sample surface. It may also be applied to patterned film stacks and substrates, where the polarization dependence of the emissivity, calculated from measurements at multiple polarizations, is related to the predictions of a model calculation of the expected polarized radiance ratio in which the modeled emissivity is computed as a weighted average of the emissivity values associated with multiple model film stack sub-models, specified independently for separate zones within the sample pattern.

Further objects of the invention are attained by the provision of apparatus adapted for making the measurements and calculations required to implement at least one of the several embodiments of the method herein described. Specifically, the invention provides apparatus capable of measuring polarization-dependent reflectance, and ellipsometric data from a sample emitting thermal energy.

As used in this specification, the phrase "measurement spot" refers to a region on a sample with a relatively smooth surface. The "take-off direction" or "vector" is defined to be along the line of sight between the measurement spot and the sensor; in the case of an imaging or multipoint sensor, there will be a different take-off vector associated with each measurement spot. The "take-off angle" is defined to be the angle between the take-off vector and the normal to the sample surface. The term "s-polarization" is defined to be the polarization state of the reflected or radiated light propagating along the take-off direction with an electric field vector oriented perpendicular to the "take-off plane" (i.e., the plane containing both the sample normal and the take-off vector), and the "p-polarization" direction is similarly defined as the polarization direction whose electric field is parallel to the take-off plane. Although the independent polarizations p1 and p2 referred to in the appended claims will, in the simplest case, be the s-polarization $p_s$ and the p-polarization $p_p$, it will be appreciated that $P_1$ and $P_2$ can also represent polarizations having electric field vectors that are not perpendicular or parallel to the take-off plane.

DETAILED DESCRIPTION OF THE PREFERRED AND ILLUSTRATED EMBODIMENTS

Figure 1:
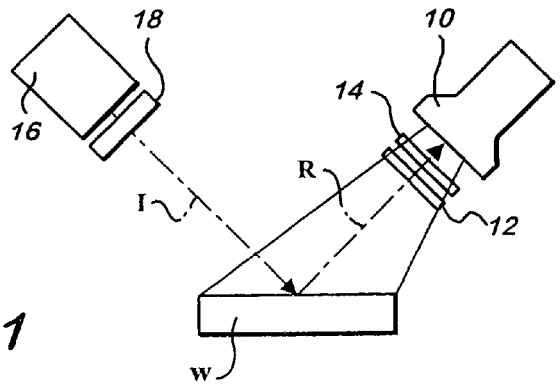
FIG. 1 is diagrammatic representation of polarized emission radiometric imaging (PERI) sensor apparatus embodying the invention and suitable for use in implementation of at least one embodiment of the method hereof.

One preferred embodiment of the method of the invention utilizes infrared polarized radiance, augmented by model-based analysis, wherein measurements of the polarization dependence of the thermal radiance are combined with a model-based analysis of the emissivity. The measurement geometry and the algorithm are shown schematically in FIGS. 1 and 2, respectively. The sensor of FIG. 1 comprises an infrared imaging camera 10, having assembled therewith a polarizer 12 (e.g., a rotatable wire grid polarizer) and a narrow band-pass infrared filter 14, the polarizer 12 and filter 14 being operatively disposed in the path of radiation from the hot wafer sample W to the camera 10. In the illustrated embodiment the apparatus also includes a radiation source 16, disposed to project an incident irradiation beam I through modulating means 18 (e.g., a shutter), to reflect as beam R from a point location on the surface of the sample W into the optics of the camera 10. The reflected radiation may be employed, in accordance with certain embodiments of the invention (discussed below), for determining the emissivity of the sample at the irradiated location.

The take-off plane is defined to contain both the substrate normal vector and the oblique line of sight between the sensor and the measurement point, and the polarized radiance components are measured through a rotating polarizer. Through appropriate signal processing, the radiance is determined in both the parallel (i.e., "p"-oriented), and perpendicular (i.e., "s"-oriented) polarization directions, relative to the plane of take-off.

Assuming the samples are sufficiently absorbing and thick to be opaque, the p and s polarized reflectances $\rho_p$ and $\rho_s$, and the associated measured p and s polarization components of the thermal radiance R(v), are related by:

$$R_p(v) = P(v,T)(1-\rho_p(v))$$

$$R_s(v) = P(v,T)(1-\rho_s(v)) \quad \text{Equation 2}$$

In the above equation, the temperature enters explicitly only in the Planck function P(v,T), scaling the polarized radiance components. Ratioing the two measurements eliminates the explicit temperature dependence, leaving a quantity equal to the ratio of the emissivities at the two polarizations, referred to (as previously noted) as the "polarized emissivity ratio" (PER):

$$\frac{R_p(v)}{R_s(v)} = \frac{1-\rho_p(v)}{1-\rho_s(v)} = \frac{\epsilon_p(v)}{\epsilon_s(v)} \quad \text{Equation 3}$$

The PER is solely a function of the film stack properties and, like the reflectance, transmittance, or ellipsometric parameters, it is amenable to model-based analysis. In many practical cases of interest, the two polarized emissivities $\epsilon_p(v)$ and $\epsilon_s(v)$ and a variety of thin film properties can be computed uniquely from the polarized emissivity ratio through model-based analysis. After the polarized emissivities are determined from the model, then the temperature can be extracted pyrometrically from the measured radiance values. In an imaging system, this can be performed on a pixel-by-pixel basis to afford high speed, real-time temperature and emissivity mapping. This approach has several advantages over competing techniques:

1) Because the technique measures the emissivity, it does not depend on an assumed value of emissivity, and is more accurate in process situations where the emissivity is either unknown or varying during the process. The technique is thus more robust and accurate than traditional pyrometry.

2) Because the emissivity is computed from a ratio of two radiance measurements, an additional reflectance measurement and associated IR source and reference sample to calibrate the emissivity are not required. The technique is thus also more robust, simple, and immune to drift than reflection-assisted pyrometry.

3) Because the technique does not require a reflectance measurement with associated dual specular viewports, it is especially adaptable to whole-wafer thermal imaging.

Algorithms that can extract the values of the p and s polarized emissivities from their measured ratio have been devised for a range of commonly encountered situations, which will be discussed presently. In the approach employed, the wafer emissivity and reflectance are related to the film stack and substrate properties through a multilayered optical model based analysis based on a transfer matrix formalism (see Yamaoto, K. and Ishida, H., *Applied Spectroscopy*, 48, (7), 775, (1994); Grosse, P., SPIE Vol. 1575, 169–179, (1991); T. Buffeteau and B. Desbat, *Applied Spectroscopy*, Vol. 43, No. 6, 1989, 8pp 1027–1032); F. Abeles, in *Advanced Optical Techniques* (North-Holland, Amsterdam, 1967), Chap. 5). The algorithms can fit arbitrary functions of the polarization dependent reflectance or emissivity using a multi-layer film stack model, as in Yamaoto et al, supra, and a model for the complex dielectric function (DF) of the layers and substrate, as in Grosse, supra.

Figure 3A:
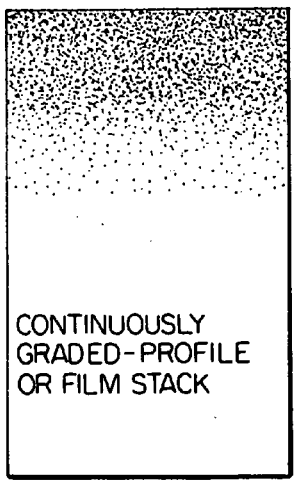
FIG. 3 is a diagram illustrating reflectance from a film stack in respect of (a) a continuously graded film, (b) a discrete multi-layered stack, and (c) a multi-layered film slack model.
Figure 3B:
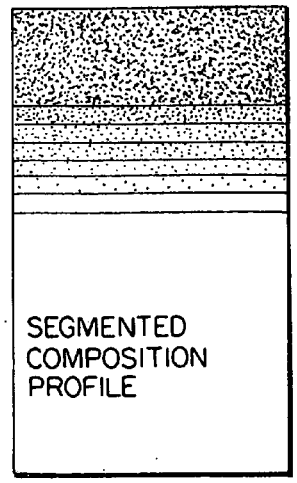
Figure 3C:
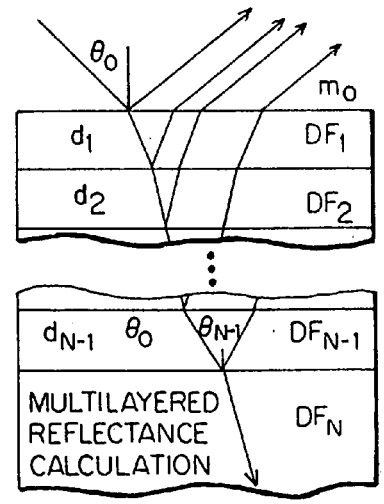

As part of the fitting algorithm, the model computes the optical properties of films with multi-layered and graded compositional profiles using a transfer matrix formalism. (See Buffeteau et al. supra, and Abeles supra). As illustrated in FIG. 3, continuously graded films (a) are modeled by segmenting them into multi-layered stacks (b), and specifying a DF for each sublayer based on its composition (c). When the optical constants of the films and substrate are sufficiently similar, virtual interface techniques and the common substrate approximation can be applied in which the underlying film stack is replaced by an effective uniform "virtual substrate" whose pseudodielectric function is computed from the polarized emissivity ratio in accordance with Aspnes (D. Aspnes, "Minimal-data approaches for determining outer-layer dielectric responses of films from kinetic reflectometric and ellipsometric measurements" J. Opt. Soc. Am. A/Vol, 10, No. 5, May 1993). This approximation is especially appropriate for epitaxial semiconductors.

In addition to a film stack or doping profile specification, the reflectance and emissivity models require a prescription for the computation of the wavelength-dependent dielectric function of each layer as a function of its composition, temperature, doping, etc. These DF models are constructed to include dispersion and absorption due to free-carriers, phonons, impurities, and interband transitions. The models are tailored to the unique optical and electronic properties of each material. Specific models for covalent semiconductors such as silicon, polar compound semiconductors such as GaAs, and SiC, metal and dielectric thin films have already been developed (see P. A. Rosenthal, P. R. Solomon, S. Farquharson, J. Haigis, S. Liu, and S. Charpenay, Final Report, Air Force Phase 1 final report, Grant No. F33615-94-C4443, "Modeling of Doping Profile for FT-IR based Control of Epi-Silicon Layer Growth," 1995). For semiconductors, the dielectric function is approximated in the infrared as a sum of a Drude term for the free carriers, possibly several damped harmonic oscillators in the mid or far infrared representing the transverse optical phonons, and a high frequency dielectric constant plus a small parabolic dispersion due to the interband transitions in the near infrared, visible, or UV ranges:

$$\varepsilon(v) = \frac{-ne^2}{(2\pi c)^2 m^* \varepsilon_0} \frac{1}{v^2 + i\gamma v} + \sum_{j=1}^{N} \frac{A_j}{v_j^2 - v^2 - i\gamma_j v} + \varepsilon_\infty + \alpha v^2 \quad \text{Equation 4}$$

For silicon and other homopolar semiconductors, the optical phonons do not couple to the infrared field to first order, and the sum of harmonic oscillators term may be dropped. When light transmitted through the wafer is important, then the multiphonon absorptions and impurity local vibrational modes may also be included for improved accuracy.

If the wavelength range approaches or encompasses the band edge region, then the last two terms are replaced with another sum of damped harmonic oscillators representing the absorptions due to interband transitions. For example, the optical band edge in GaAs has been modeled using discrete harmonic oscillators associated with the fundamental absorption and critical point energies (see M. Erman, J. B. Theeten, P. Chambon, S. M. Kelso, and D. E. Aspnes, J.A.P. 56, 2664, (1984). Other empirical approaches to modeling optical constants as a function of composition involve interpolating optical constants from dielectric function data obtained from spectroscopic ellipsometry measurements on samples of known composition (see P. Synder, J. Woollam, S. Alterovitz, and B. Johs, "Modeling of $Al_xGa_{1-x}$ As Optical Constants as Functions of Composition," J.A.P. 68 (11), 1990, pp. 5925). For the materials of primary interest here, the optical band edges are in the near infrared or visible, and the optical constants are comparatively simple to model in the mid infrared using Equation 4 and its various simplifications.

In many cases the DF can be simplified considerably using knowledge of the specific material properties. For example, to a very good approximation, between 2 µm and 5 µm wavelengths, the dielectric function of lightly doped silicon and $SiO_2$ are positive real constants with small imaginary components. Thus, a single wavelength-independent parameter is required to characterize the complex index of refraction of these materials in the indicated wavelength range, as long as the wafers are thick enough to be opaque.

In general, an automated solution routine varies the parameters of the film stack, substrate, and their DF model parameters to fit the measured and modeled polarized emissivity ratios. Once these parameters have been determined, the emissivity is calculated and combined with the measured radiance to obtain the temperature through comparison to a Planck function, as described in the above identified Morrison et al. patent.

Illustrative of the efficacy of the present method are the following examples:

EXAMPLE ONE

A bare, polished, lightly doped silicon substrate, at approximately 750° C., is used for making measurements of polarized radiance, augmented by model-based analysis. At the specified temperature, the free carrier absorption is strong enough to render the wafer opaque through most of the mid infrared band, but the absorption index k is small enough that it has a negligible effect on the reflectance and emissivity; a similar situation occurs for germanium and many other semiconductors. The polarized emissivity ratio in this case is given by:

$$\frac{\epsilon_p}{\epsilon_s} = \frac{1-\rho_p}{1-\rho_s} = \frac{1-\left(\frac{n\cos(\theta) - \sqrt{1-\sin^2(\theta)/n^2}}{n\cos(\theta) + \sqrt{1-\sin^2(\theta)/n^2}}\right)^2}{1-\left(\frac{\cos(\theta) - \sqrt{n^2-\sin^2(\theta)}}{\cos(\theta) + \sqrt{n^2-\sin^2(\theta)}}\right)^2}.$$ Equation 5

From a measurement of the PER, the index of refraction of the substrate is uniquely determined and can be computed numerically using Equation 5. With the index of refraction of the substrate calculated from Equation 5, the emissivities in the two orthogonal polarizations can be computed, and the radiance can be related to the temperature using a Planck function.

Figure 4A:
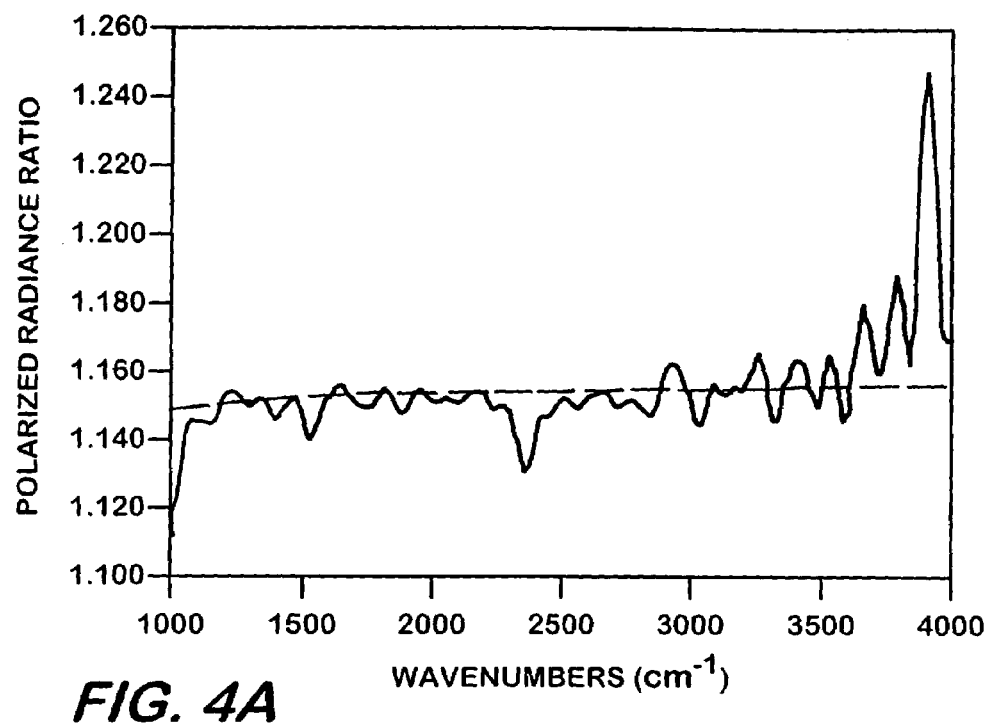
FIG. 4 comprises curves showing polarized radiance measurements of a hot bare polished silicon wafer, in respect of (a) the polarized emissivity ratio (PER) and model-based fit, and (b) Planck fit to normalized radiance.

FIG. 4 shows measurements that demonstrate this analysis. In this experiment, a silicon sample was heated from behind to approximately 750° C., using a radiant heater. The radiance was measured at a 30° takeoff angle at both the p and s polarizations using a Fourier transform infrared spectrometer. The measurements covered the spectral range from 1200 cm$^{-1}$ to 4000 cm$^{-1}$. The measured polarized emissivity ratio $\epsilon_p/\epsilon_s$ as a function of wavenumber is shown in FIG. 4(a). The PER was simulated using the Fresnel relations, and the index of refraction was varied in the model until the simulated PER fit the measured PER. The fit is shown in FIG. 4(a) as a dashed line.

Figure 4B:
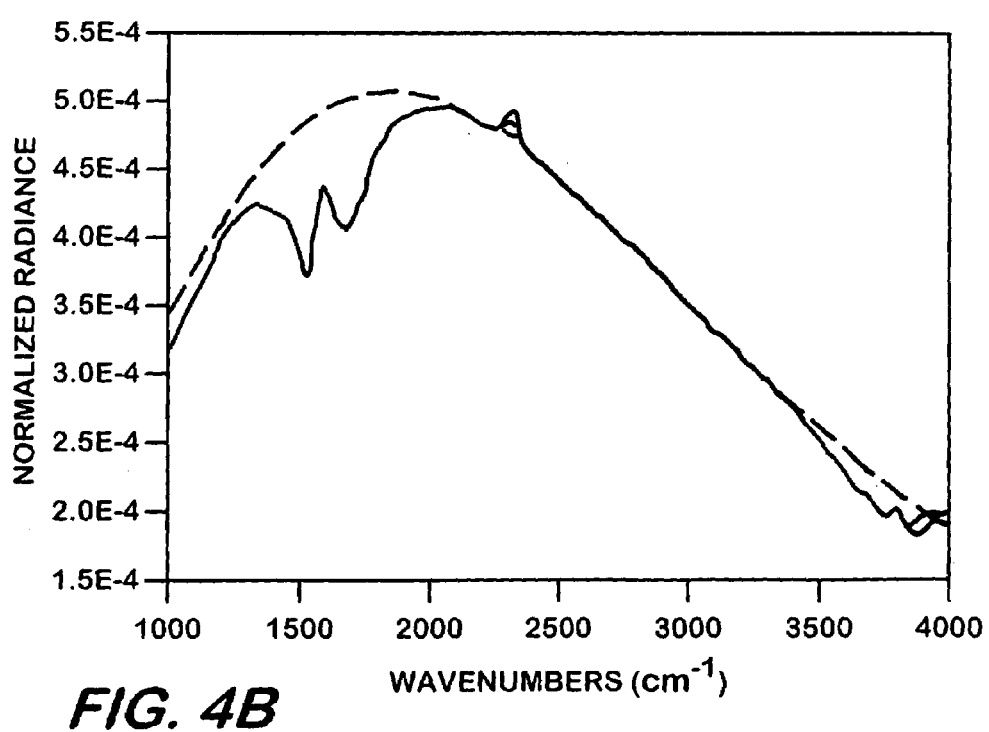

From the fit, the index of refraction of the silicon at the specified temperature was determined to be 3.42, close to the room temperature value. With the fitted value for the index of refraction, the emissivity of the sample at the p and s polarizations was computed, and the radiance (normalized by the modeled emissivity) was fit to a Planck function. The Planck fits are shown in FIG. 4(b), and are excellent; apart from some absorptions due to water vapor and $CO_2$ in the laboratory, the models are nearly indistinguishable from the measured data. The temperature inferred from the Planck fit was 686° C., within 2° C. of a measurement performed with a pyrometer, with an assumed emissivity, obtained from literature, of 0.66. As an additional validation of the approach, the emissivity was also determined directly using the FTIR configured for emission reflection analysis, as described by Morrison et al. The Planck fits for the emission reflection data also yielded temperatures within 2° C. of the polarized radiance measurements.

The foregoing Example illustrates several important points. First, it has been demonstrated that an accurate temperature measurement of a homogeneous sample can be performed assuming only that the value of n is much greater than that of k, which assumption is valid for most semiconductors over a wide range of infrared wavelengths. Secondly, it has been demonstrated that, using the method described, the index of refraction and emissivity of the substrate can readily be measured, thus providing additional information that is not available from a traditional pyrometer measurement. And finally, the measurements require access to the wafer along only one line of sight, thus satisfying convenient or necessary geometric constraints.

EXAMPLE TWO

Figure 5A:
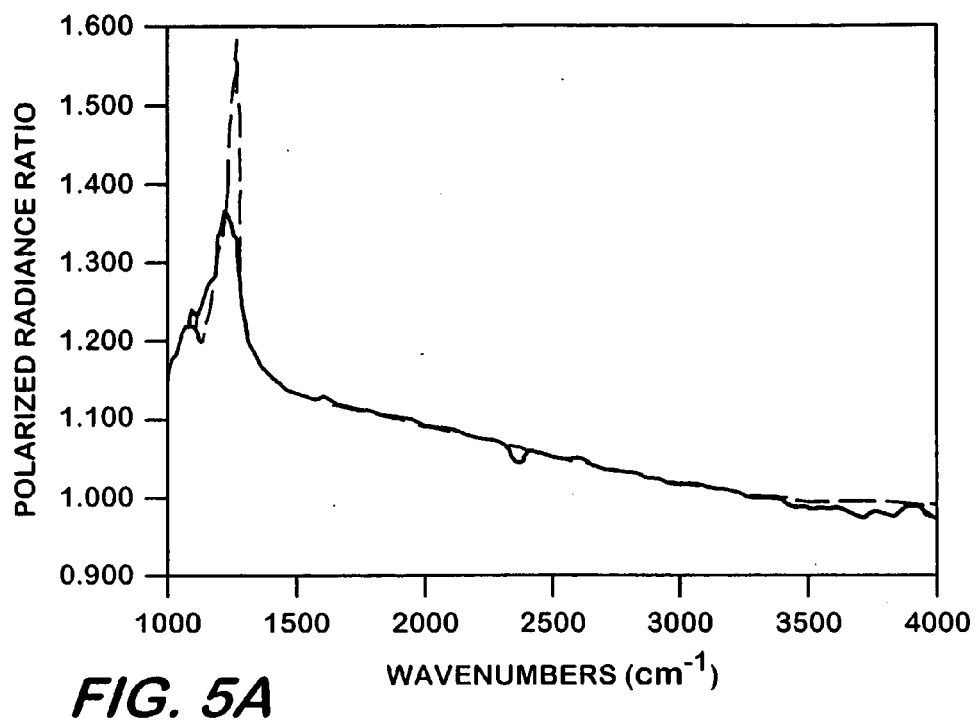
FIG. 5 comprises curves showing polarized radiance measurements of a silicon dioxide film on a silicon substrate, in respect of (a) PER and model-based fit, and (b) Planck fit to normalized radiance.
Figure 5B:
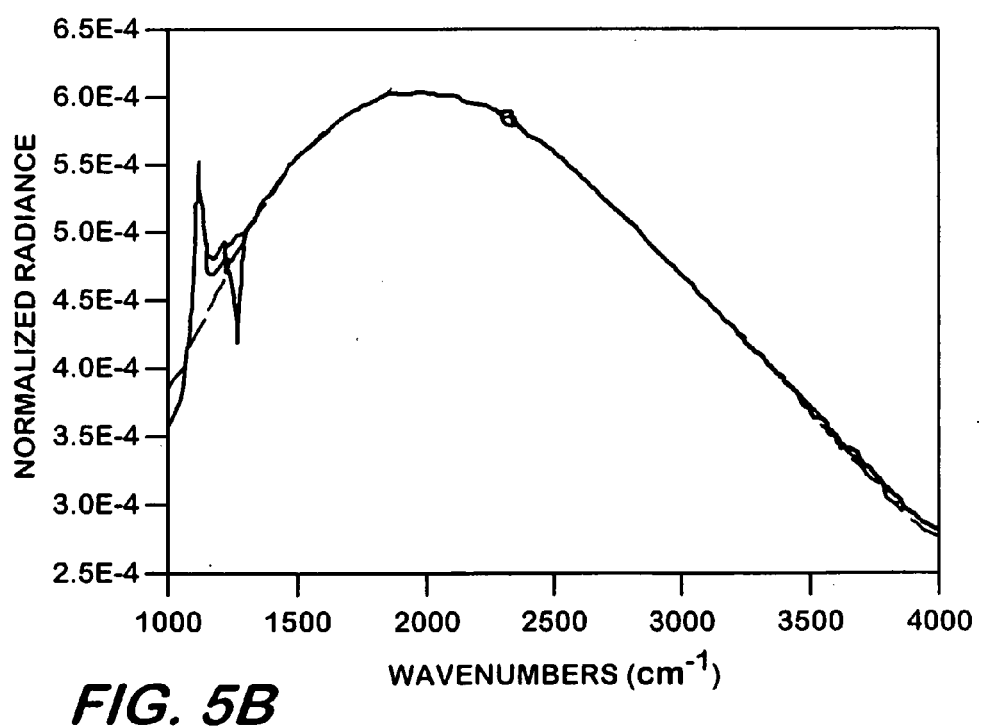

As a second example, it is demonstrated that the instant method can be generalized to more complex situations, including samples with overlayers. Taking, in this instance, a hot silicon wafer carrying thin silicon dioxide film, the polarized radiance ratio, measured with an FT-IR at a take-off angle of 30°, is shown in FIG. 5(a). This spectrum was fit to a model in which the silicon oxide thickness was varied, and the optical constants of the silicon and silicon oxide were approximated by their room temperature values. FIG. 5(a) also shows the overlayed fit. The thickness was determined from the fit to be given by 0.48 micron. Using the now known thickness and the optical constants of the silicon substrate and the silicon oxide overlayer, the emissivity was calculated using a transfer matrix formalism similar to that described by Springthorpe et al. (A. J. Springthorpe, T. P. Humphreys, A Majeed, and W. T. Moore, Applied Phys. Lett. 55, (2), pp 2138–2140, 1989). The radiance spectra in the p and s directions, normalized by the modeled emissivities, was then fit to the Planck law, as shown in FIG. 5(b). The temperature determined in this way was in excellent agreement with independent measurements performed according to the method described in the Morrison et al. patent.

Because the emissivity model in this case has only one free parameter, i.e., the $SiO_2$ thickness, this analysis could be accomplished using data from only one wavelength, rather than across a wide spectral range. This is an ideal situation for applying the analysis to data from an infrared camera, where data are obtained one wavelength at a time.

EXAMPLE THREE

A third example of the method employs a sample having a non-specular surface, i.e., a sample that is relatively smooth on a macroscopic scale but rough enough to be a diffuse scatterer at infrared wavelengths, a situation that is often encountered when measuring the backsides of the single-side polished silicon wafers that are commonly employed in semiconductor manufacturing. In such a case, the sample is assumed to be specular, from the point of view of emission, with the effect of the sample roughness being largely to provide a distribution of takeoff angles from a given measurement spot. If this distribution is sufficiently narrow, as it commonly is for modern silicon wafers, then the emissivity is sufficiently well described by the average takeoff angle to provide an accurate emissivity and temperature measurement.

Figure 6A:
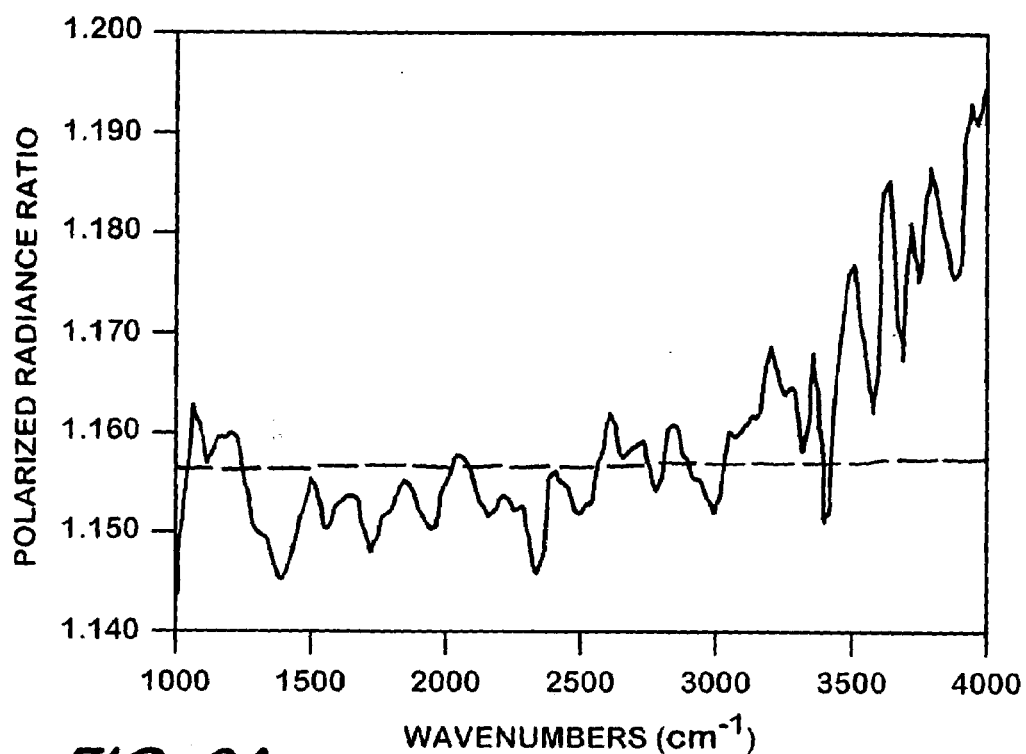
FIG. 6 comprises curves showing polarized radiance of a hot, unpolished wafer backside, in respect of (a) PER and model-based fit, and (b) Planck fit to normalized radiance.
Figure 6B:
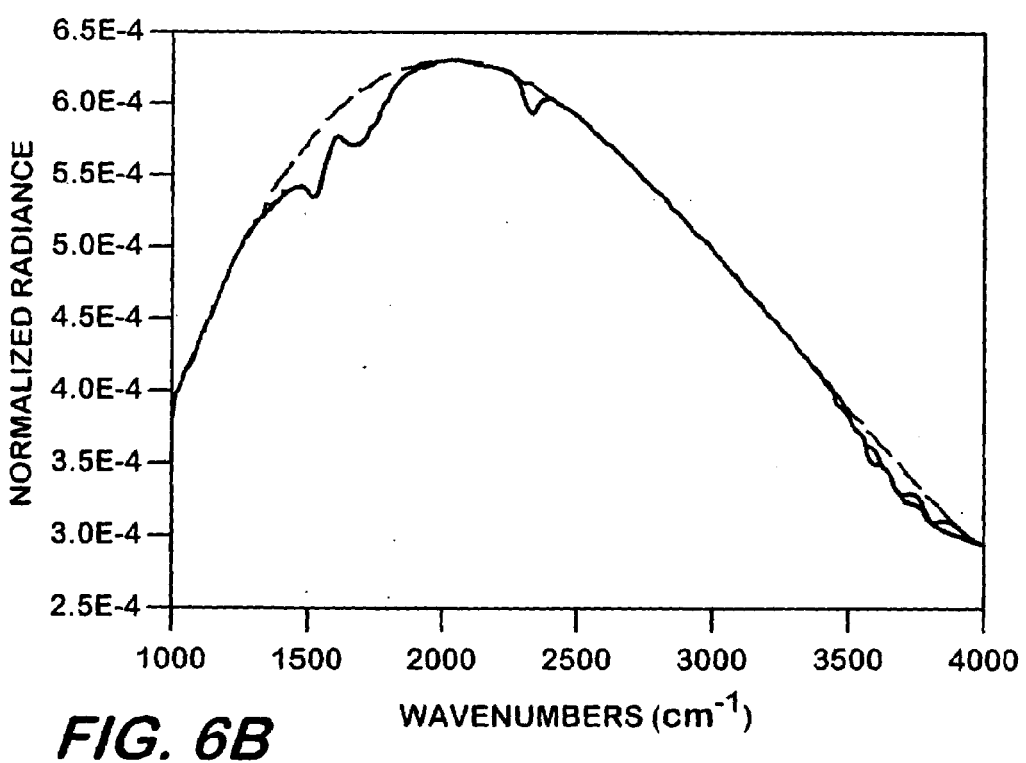

FIG. 6(a) shows a measurement of the polarized radiance ratio from a hot, smooth, but non-specular, silicon wafer backside at a 30° take-off angle, overlayed with a fit assuming a specular surface. As in Example One, the index of refraction was varied in the fit. With the index determined in this way, and again assuming specular optics, the emissivity was determined at the p and s polarizations. The p and s radiance spectra, normalized by the modeled emissivities, are shown in FIG. 6(b), overlayed with fits to Planck functions. The spectra and fits at the two polarizations are nearly indistinguishable, except in regions of atmospheric absorption. The temperature determined from the fits was within several degrees of values obtained using independent pyrometric measurements.

EXAMPLE FOUR

Because the present method requires only a single line of sight between the sensor and the sample, without an additional reflected beam, it is particularly well adapted for making multipoint measurements. This can be accomplished either by using detector arrays to image multiple points, or by using optical scanners to steer the measurement beam to various spots on a sample.

In many cases, such as in the preceding Examples, the polarized radiance ratio was related to only a single scalar quantity, e.g., the index of refraction in Examples One and Three, and the film thickness in Example Two; in these cases the emissivity could be determined by a measurement at a single wavelength. This allows the particularly facile application of the model-based polarized radiance technique to using a detector sensitive only to a narrow band of wavelengths, which may be simpler to implement than a spectroscopic system. Multiple wavelength systems can accordingly be built up from arrays of narrowband sensors, and clearly, other spectrometer technologies, such as grating-based instruments, can be substituted for the FT-IR embodiment described in Examples One through Three.

Although augmenting the polarized radiance measurements with model-based analysis is attractive, especially because it allows measurements using a single line of sight to the sample, it does require having certain knowledge of the optical properties and geometry of the sample, so as to construct the model to relate the emissivity to the polarized radiance ratio. In some circumstances, therefore, an alternative approach might be more advantageous; the necessary additional information can, for example, also be obtained from polarized measurements of the reflectance if so desired.

Figure 2:
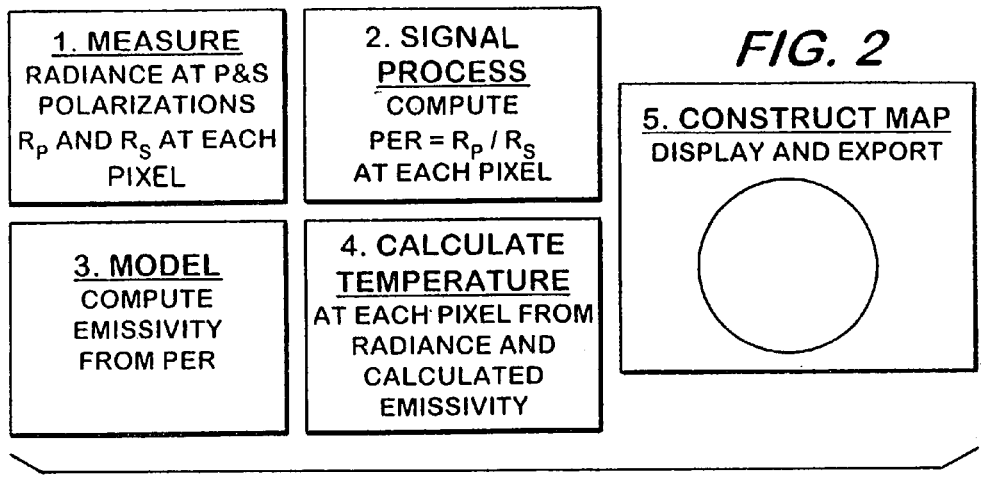
FIG. 2 is a schematic representation of an algorithm employed in accordance herewith for analysis and mapping of the temperature distribution on the surface of a hot wafer.

Considering the case of a hot, radiating opaque sample illuminated with a shuttered beam of light at an oblique angle of incidence, a sensor equipped with a polarizer may be positioned to collect both the reflected and radiated light; FIG. 1 shows an appropriate configuration. Four spectra are acquired; i.e., with the shutter closed the radiance is measured in both the p and s polarizations (spectra 1 and 2), and with the shutter open the radiance plus the emission are measured in both the p and s polarizations (spectra 3 and 4). Computing the ratio of these two differences yields the polarized reflectance ratio $\rho_p/\rho_s$. Computing the ratio Spectrum 1/Spectrum 2 yields the polarized radiance ratio, which can be expressed as $R_p/R_s=(1-\rho_p)/(1-\rho_s)$. These two equations can then be solved for $\rho_p$ and $\rho_s$. Once the reflectances are determined, the emissivities in the p and s orientations can be calculated and used to relate the measured radiance to the temperature according to the Planck radiation law, as in the other examples given.

EXAMPLE FIVE

Using a Fourier transform spectrometer equipped with a polarizer and an infrared source (FT-IR), the polarized reflectance and radiance ratios were measured from a hot silicon sample. The reflectance and emissivities in the p and s orientations were determined from the measurements, and the emissivities were used to relate the measured polarized radiance spectra to the temperature according to the Planck law. Utilizing the measured polarized reflectance and radiance ratios, emissivities in the p and s polarizations are extracted and Planck fits are made to the radiance normalized by the measured emissivities. The temperatures determined from the two fits are nearly identical, and the results were within several centigrade degrees of measurements using a calibrated pyrometer.

The foregoing Example demonstrates the principle of using a spectral analysis in which measurements were performed essentially independently at multitude of wavelengths. Because the relations hold independently at each wavelength, the method can be implemented using single wavelength or narrowband sources and sensors, thus simplifying the hardware. This method has the benefit that the reflectance and emissivities are entirely determined from ratio measurements, rendering the technique largely immune to slow drifts in the optics due to sample tilts and detector drifts, and thus constituting a significant advance in FT-IR technology.

EXAMPLE SIX

A commercially patterned wafer was analyzed using the polarized emission radiometric imaging (PERI) model described; the emissivity at each point was not known. A crude model was employed, which uses effective medium theory in the following way: it is assumed that the effect of the complex film stack forming the pattern can be approximated by a single "equivalent" layer, whose index of refraction can be fitted at each point of the wafer. The measurements were spatially averaged to various degrees in an attempt to smooth out the spatial emissivity variations. An extensive point averaging was found to function fairly well, with the temperature at the center of the wafer matching that determined by FT-IR within 1° C., with a standard deviation of ±3° C.; where less averaging the used, the results appear more "spotty."

Among the preferred optical configurations for systems embodying the invention, are the following:

A first preferred system is capable of performing combined reflection and emission measurements at a single point on a sample, performed at multiple wavelengths using a spectroscopic sensor apparatus, such as a Fourier transform or a grating spectrometer equipped with an external chopped source and polarizing optics. The polarized measurements can be analyzed according to the measurement algorithms to determine substrate properties, layer properties such as thickness and composition thicknesses, emissivity, and temperature.

A second preferred system is capable of performing temperature measurements from polarized radiance measurements at multiple points on a sample, employing multi-element detector arrays equipped with adjustable polarizing apparatus. The polarizing apparatus can be either mechanically rotated, as for example wire grid, Glan, or Brewster polarizers, or it can be modulated electronically, as in a photoelastic modulator or a liquid crystal modulator.

Also preferred are systems for single point, single wavelength, or narrow band polarized emission and reflectance measurements (the latter using a narrow band source such as from a laser, a light emitting diode, or a broadband source with a narrow band filter), a single detector, and a rotating or tunable polarizing apparatus. The single detector/variable polarizer combination could be replaced with a detector array in which each detector is filtered by a polarizer at a different orientation.

Another preferred form of optical configurations comprises a multi-point and imaging system that uses an opto-mechanical scanner to scan the field of view of the detector to user-specified locations on the sample. Such systems can be optionally equipped with shuttered, and possibly polarized, sources to allow multipoint polarized reflection and emission measurements to be made. When equipped with a shuttered, polarized source and a polarized detector, the apparatus can be employed to perform polarized radiance measurements and photometric ellipsometry.

To facilitate the development of the machine vision and emissivity modeling algorithms that are suitable for real-time processing, a system with a high-level language compiler is believed to be desirable. Also, to allow the image processing hardware to support continually increasing data throughput requirements as the focal plane arrays get denser and the algorithms get more sophisticated, the hardware would ideally be scalable.

The technology described herein provides an extremely generic approach to monitoring thin film processes. The following specific applications are regarded however as especially promising:

Firstly, it would be desirable to migrate many batch processes to rapid thermal processing to gain advantages in throughput and yield. As junction implants get shallower, and device feature sizes get smaller, the activation anneal for shallow junctions has become an increasingly critical step. In the shallow junction process, the wafer starts with and implantation of dopant atoms. These dopant atoms sit largely at interstitial sites and do not liberate free carriers. An anneal is required to crystallize the interstitial and otherwise inactive dopants into substitutional sites, thereby activating their carriers. This process requires precise control because, while the anneal is transpiring, the implanted dopants are diffusing into and out of the wafer, smearing the doping profiles from their desired shapes. A fast accurate whole wafer sensor, such as the imaging radiometer herein described, can greatly improve the process uniformity for the shallow junction anneal by providing an accurate measure of both the temperature and the carrier activation process endpoint and uniformity.

As a second such potential application, advanced photoresists are using increasingly shorter UV wavelengths and more complicated chemistries in an effort to continue to decrease feature sizes in future IC's without requiring a revolutionary change in lithographic technology. The most promising new photoresist chemistries are known as chemically amplified resists. To process these resist formulations, the wafers must be baked after exposure but before developing. This is known as a post-exposure bake (PEB), and is an extremely temperature-critical step. Future requirements for process control are estimated to be in the range of ±1° C. During the PEB, catalytic destruction of aldehyde functional groups results in an increase in the concentration of hydroxyl groups. These aldehyde and hydroxyl groups have strong signatures in the mid infrared, which can be used to monitor the reaction kinetics. An imaging radiometer with a filter tuned to a selected functional group absorption band could be employed to monitor the reaction across the entire wafer for endpoint and uniformity, while the temperature and emissivity monitoring capabilities of the sensor could be used to ensure that the stringent temperature requirements were met. Similar temperature and chemistry monitoring considerations apply to other electronic polymer films, such as polyimides, spin-on-glasses, and other resists.

The emergence of molecular beam epitaxy (MBE) as a leading manufacturing technology for compound semiconducting structures and devices represents another particularly promising application for the instant methodology. Although it is a remarkably controllable and precise technology, the demands of monolayer control of composition and doping are severe, and MBE growth requires exquisite control of the substrate temperature as well as of the rate and uniformity of the delivery of source fluxes. In many situations, process yield limitations are brought about by the high sensitivity to growth conditions of epitaxial layer properties, and the inability to control growth conditions adequately throughout the growth sequence. Present MBE technology relies on the inference of important growth parameters from indirect sensor signals, and open loop control using previous calibration data, together with the often unfulfilled hope that growth conditions will not drift appreciably, both within a given growth run or from run-to-run.

Polarized emission radiometric spectral and imaging sensors embodying the present invention afford great potential for improved control of the MBE growth process, by monitoring temperature and layer uniformity in real-time during growth. Most MBE systems are designed with optical windows specifically dedicated for optical process monitors, thereby enabling ready adaption of the PERI sensor to MBE process tools. Because many MBE systems employ rotating substrates to improve uniformity, however, analysis of the infrared images is complicated by the fact that a particular spot on the wafer will sweep across an arc in the field of view as the substrate rotates. To handle this complication, it is anticipated that the machine vision algorithms will be extended to recognize wafer rotational position as well as tilt angle and distance.

In its most basic form, the hardware for a polarimetric imaging radiometer embodying the invention will include a camera mounted a polarizer and coupled to the chamber of a reactor. The camera would typically be mounted on a platform together with a diaphragm iris and a zinc selenide polarizer, the polarizer being held in a precision, manual drive rotator for precise orthogonal positioning, and the iris being adjusted so as to be the limiting aperture of the sensor assembly.

The software employed will be coded (e.g., in Labview) to perform the complete polarimetric measurements of temperature and emissivity. It will include machine vision algorithms to accurately locate the wafer in the field of view of the camera, to determine its orientation and distance relative to the camera, and to map pixel coordinates to wafer coordinates; algorithms to compute the local takeoff angles and p and s polarization vectors for each location on the wafer surface; and a polarization-dependent emissivity model to extract wafer temperature and emissivity from the thermal images. During a measurement, the radiometer software will preferably follow the following sequence of actions: (1) the raw camera temperatures are obtained from two azimuthal positions of the polarizer; (2) the machine vision software maps each camera pixel to a point on the wafer, and determines the take-off angle at each point on the wafer (which is important to get accurate emissivity determination); (3) the machine vision software performs pixel averaging to reduce noise due to pixel-to-pixel variations, and to increase the speed of the calculation; (4) the calibration routine calculates the calibrated radiance in the two polarizer directions; (5) the machine vision software calculates the radiance s and p at each wafer point as linear combinations of the radiance measured in the previous step (thus compensating for the fact that the s and p directions are functions of position on the wafer); (6) the emissivity software calculates the emissivity (in both the s and p directions) from the ratio of the p and s radiance intensities for each point on the wafer; and (7) the temperature is computed pyrometrically from the measured radiance and the calculated emissivity in both s and p directions, according to the Planck formula.

Finally, it is noted that the following algorithms and electronic signal processing parameters apply: Because the s and p polarized emissivities are extremal values of the general polarized emissivity, they can be measured efficiently from the peak to peak variation and mean value observed as the detector polarizer undergoes rotation.

Assignment of s or p to the maximum or minimum value is performed by correlating the phase of the oscillating signal to the relative azimuth of the polarizer. For example, if the maximum signal occurs when the polarizer azimuth is accepting the p oriented component, then the p is assigned to be the maximum and the s to be the minimum emissivity value, and the polarized emissivity ratio $\epsilon_s$ is given by Max(Signal)/Min(Signal). If the signal is represented as a dc and an ac component, i.e. $I=I_{dc}+I_{ac}\sin(\theta_p+\delta)$, then $\epsilon_s$ can also be measured from the signal mean $I_{dc}$ and rms value of the signal ac component $I_{ac}$ as $$\frac{\epsilon_p}{\epsilon_s} = \frac{I_{dc} + \sqrt{2}\,\mathrm{RMS}(I-I_{dc})}{I_{dc} - \sqrt{2}\,\mathrm{RMS}(I-I_{dc})}$$

again assuming in this example that the maximum emissivity value is identified from the relative phase between the polarizer and the detector signal as the p component. These calculations can be performed either using analog electronics or digitally, using a computer or digital signal processor.

The values associated with the p and s polarized signals can also be determined from any pair of linearly independent polarization measurements, including non-orthogonal directions. For example, if measurement $I_1$ and $I_2$ measure the linear combination $I_1=aI_p+bI_s$, $I_2=cI_p+dI_s$, then in matrix notation the expression:

$$\begin{pmatrix} I_1 \\ I_2 \end{pmatrix} = \begin{pmatrix} a & b \\ c & d \end{pmatrix} \begin{pmatrix} I_p \\ I_s \end{pmatrix}$$

can be written. If the two measurements are linearly independent combinations of the two polarizations, then for the pure polarization components $$\begin{pmatrix} I_p \\ I_s \end{pmatrix} = \begin{pmatrix} a & b \\ c & d \end{pmatrix}^{-1} \begin{pmatrix} I_1 \\ I_2 \end{pmatrix}$$

can easily be solved for. In this approach, the parameters a,b,c, and d are instrumental parameters that can be determined through appropriate calibration.

Thus, it can be seen that the present invention provides a method and apparatus which enable emissivity tracking without need for an extrinsic light source for making reflectance measurements. The invention also provides a method and apparatus that are capable of performing combined reflection and emission measurements at a single point on a sample, performed at multiple wavelengths; it provides a method and apparatus that are capable of performing temperature measurements from polarized radiance measurements at multiple points on a sample; it provides a method and apparatus for single point/single wavelength, or narrow band polarized emission and reflectance measurements; and it provides a method and apparatus for a multi-point imaging, using an optomechanical scanner to scan the field of view of the detector to user-specified locations on the sample.

Having thus described the invention, what is claimed is:

1. A method for determining the temperature T at at least one location on the surface of a sample, comprising the steps:
    (a) measuring, at an oblique take-off angle and at at least one wavelength v, radiance at at least two linearly independent polarizations p1 and p2;
    (b) computing a polarized radiance ratio $R_{p1}(v)/R_{p2}(v)$ of said measured radiances $R_{p1}(v)$, $R_{p2}(v)$ to determine the associated polarized emissivity ratio $\epsilon_{p1}(v)/\epsilon_{p2}(v)$, in accordance with the relationship $R_{p1}(v)/R_{p2}(v)=\epsilon_{p1}(v)\epsilon_{p2}(v)$;
    (c) applying at least one additional constraint to compute the value of at least one of the emissivities, $\epsilon_{p1}(v)$, $\epsilon_{p2}(v)$, constituting said polarized emissivity ratio;
    (d) determining the temperature T at said one location by solving the equation:

$$R_{p1}(v,T)=\epsilon_{p1}(vT)\times P(v,T),$$

wherein P(v,T) is the Planck function;
    (e) irradiating said surface with radiation including said wavelength v, and measuring reflectance ρ from said surface at said wavelength v and said polarizations p1 and p2 to thereby determine the reflectance-derived ratio $1-\epsilon_{p1}(v)/1-\epsilon_{p2}(v)$; and
    (f) applying said reflectance-derived ratio as said at least one additional constraint in said step (c) for computing said at least one emissivity value.

2. The method of claim 1 wherein one of said polarizations p1 and p2 is determined in the parallel direction, and the other of said polarizations p1 and p2 is determined in the perpendicular direction, both with reference to the take-off plane.

3. The method of claim 1 wherein said surface is the surface of a film comprising said sample, said method including the further step of utilizing one of said polarized radiance ratio and said polarized emissivity ratio to determine at least one additional parameter of said film, said parameter being selected from the group consisting of thickness, composition, roughness, crystallinity, interface quality, and strain.

4. The method of claim 1 wherein said additional constraint of said step (c) is determined from model-based analysis using at least one layered optical stack model incorporation a Fresnel model for interfaces.

5. The method of claim 4 wherein said model-based analysis utilizes a fitting routine in which at least one parameter selected from the class consisting of film thickness, composition, optical properties, and fractional area within a measurement spot is varied to achieve values consistent with said determined polarized emissivity ratio.

6. The method of claim 1 including the additional step of providing a look-up table in which values of emissivity are correlated to values of polarized emissivity ratios, and wherein the emissivity value in said look-up table, corresponding to said determined emissivity ratio, constitutes said additional constraint applied in said step (c).

7. The method of claim 1 wherein said steps (a) through (d) are repeated at each of a multiplicity of locations on said sample surface to develop a temperature distribution map of said surface.

8. A method for determining the emissivity ε at at least one location on the surface of a sample, comprising the steps:
    (a) measuring, at an oblique take-off angle and at at least one wavelength v, radiance at at least two linearly independent polarizations p1 and p2;

(b) computing a polarized radiance ratio $R_{p1}(v)/R_{p2}(v)$ of said measured radiances $R_{p1}(v)$, $R_{p2}(v)$ to determine the associated polarized emissivity ratio $\epsilon_{p1}(v)/\epsilon_{p2}(v)$, in accordance with the relationship $R_{p1}(v)/R_{p2}(v)=\epsilon_{p1}(v)/\epsilon_{p2}(v)$;

(c) applying at least one additional constraint to compute the value of at least one of the emissivities, $\epsilon_{p1}(v)$, $\epsilon_{p2}(P)$, constituting said polarized emissivity ratio;

(d) irradiating said surface with radiation including said wavelength v, and measuring reflectance ρ from said surface at said wavelength v and said polarizations p1 and p2 to thereby determine the reflectance-derived ratio $1-\epsilon_{p1}(v)/1-\epsilon_{p2}(v)$; and (e) applying said reflectance-derived ratio as said at least one additional constraint in said step (c) for computing said at least one emissivity value.

9. The method of claim 8 wherein one of said polarizations p1 and p2 is determined in the parallel direction, and the other of said polarizations p1 and p2 is determined in the perpendicular direction, both directions being taken with reference to the take-off plane.

10. The method of claim 8 wherein said additional constraint of said step (c) is determined from model-based analysis using at least one layered optical stack model incorporation a Fresnel model for interfaces.

11. Apparatus for determining at least one emissivity value ε from a surface of a sample, comprising a radiance sensor including a radiation detector, polarization selective means, wavelength selective means, and electronic data processing means, said sensor being configured for carrying out the following steps:

(a) measuring, at an oblique take-off angle and at at least one wavelength v, radiance at at least two linearly independent polarizations p1 and p2;

(b) computing a polarized radiance ratio $R_{p2}(v)/R_{p2}(v)$ of said measured radiances $R_{p1}(v)$, $R_{p2}(v)$ to determine the associated polarized emissivity ratio $\epsilon_{p1}(v)/\epsilon_{p2}(v)$, in accordance with the relationship $R_{p1}(v)/R_{p2}(v)=\epsilon_{p1}(v)/\epsilon_{p2}(v)$;

(c) applying at least one additional constraint to compute the value of at least one of the emissivities, $\epsilon_{p1}(v)$, $\epsilon_{p2}(v)$, constituting said polarized emissivity ratio;

(d) measuring reflectance ρ from said surface at said wavelength v and said polarizations p1 and p2 to thereby determine the reflectance-derived ratio $1-\epsilon_{p1}(v)/1-\epsilon_{p2}(v)$; and (e) applying said reflectance-derived ratio as said at least one additional constraint in said step (c) for computing said at least one emissivity value.

12. The apparatus of claim 11 wherein said sensor is further configured to carry out the additional step of determining the temperature T at said one location by solving the equation:

$$R_{p1}(v,T)=\epsilon_{p1}(vT)\times P(v,T),$$

wherein P(v,T) is the Planck function.

13. The apparatus of claim 11 wherein said polarization selective means is a polarizer selected from the group consisting of wire grid, glan, and Brewster polarizers.

14. The apparatus of claim 11 wherein said wavelength selective means is a device selected from the group consisting of interference filter sets, tunable filters, gratings, prisms, Michelson interferometers, and FT-IR spectrometers.

15. The apparatus of claim 14 wherein said sensor comprises an FT-IR spectrometer.

16. The apparatus of claim 11 additionally including a source of illuminating radiation disposed for projecting a beam of radiation toward a surface of a sample being subjected to emissivity determination therein.

17. The apparatus of claim 16 wherein said source of the illuminating radiation and said sensor are so disposed that the beam of radiation from said source is reflected by the sample to said sensor.

18. The apparatus of claim 16 additionally including means for modulating the beam of radiation from said source.

19. The apparatus of claim 11 wherein said sensor incorporates a look-up table by which emissivity values are correlated to values of polarized emissivity ratios.

* * * * *

UNITED STATES PATENT AND TRADEMARK OFFICE
CERTIFICATE OF CORRECTION

| | |
|---|---|
| PATENT NO. | : 7,155,363 B1 |
| APPLICATION NO. | : 09/199677 |
| DATED | : December 26, 2006 |
| INVENTOR(S) | : Rosenthal et al. |

It is certified that error appears in the above-identified patent and that said Letters Patent is hereby corrected as shown below:

In claim 1(c), column 1, line 15, add --and-- after ";"

In claim 11(b), column 17, line 35 replace "$R_{p2}(v)/R_{p2}(v)$" with --$R_{p1}(v)/R_{p2}(v)$--

Signed and Sealed this

Third Day of April, 2007

JON W. DUDAS
*Director of the United States Patent and Trademark Office*